United States Patent [19]

Inou

[11] Patent Number: 5,793,461
[45] Date of Patent: Aug. 11, 1998

[54] LIQUID CRYSTAL DISPLAY ELEMENT AND MANUFACTURING METHOD THEREOF INCLUDING APPLYING BOTH UV AND IR LIGHT TO THE SEAL

[75] Inventor: Ippei Inou, Yamatokoriyama, Japan

[73] Assignee: Sharp Kabushiki Kaisha, Osaka, Japan

[21] Appl. No.: 471,339

[22] Filed: Jun. 6, 1995

[30] Foreign Application Priority Data

Jun. 24, 1994 [JP] Japan .................... 6-143264

[51] Int. Cl.⁶ .................... G02F 1/1339; G02F 1/1333
[52] U.S. Cl. .................... 349/153; 349/158
[58] Field of Search .................... 359/80, 81, 62; 349/153, 158

[56] References Cited

U.S. PATENT DOCUMENTS 4,401,537  8/1983  Chern et al. .................... 359/80

FOREIGN PATENT DOCUMENTS

| 55-041488 | 3/1980 | Japan | 359/80 |
| 56-095220 | 8/1981 | Japan | 359/80 |
| 57-135922 | 8/1982 | Japan | 359/80 |
| 60-232530 | 11/1985 | Japan | 359/80 |
| 1-112128 | 5/1986 | Japan | 359/80 |
| 1-266510 | 10/1989 | Japan | 359/80 |
| 3-83012 | 4/1991 | Japan . | |
| 3-248129 | 11/1991 | Japan | 359/80 |
| 3-269519 | 12/1991 | Japan | 359/80 |
| 4-011223 | 1/1992 | Japan | 359/80 |
| 4-238322 | 8/1992 | Japan . | |
| 4-242717 | 8/1992 | Japan . | |
| 5-273563 | 10/1993 | Japan . | |
| 2064155 | 6/1981 | United Kingdom | 359/80 |

OTHER PUBLICATIONS

K. Kimura et al. "High–Polymer New Material, One Point–18, High–Performance Adhesive–Pressure Sensitive Adhesive Agent" *Kyoritsu Publishing Co., Ltd.* Feb. 20, 1989, pp. 19–25.

*Primary Examiner*—Anita Pellman Gross
*Attorney, Agent, or Firm*—David G. Conlin; George W. Neuner

[57] ABSTRACT

A method of manufacturing a liquid crystal display element composed of a lamination of a plastic substrate and a glass substrate with a gap therebetween comprising the steps of: interposing an ultraviolet-ray setting sealing agent between the plastic and glass substrates; and irradiating an ultraviolet laser beam and a carbon dioxide gas laser beam to the sealing agent simultaneously. As a result, a thin, light liquid crystal display element comprising the glass substrate with active elements thereon and the plastic substrate with a color filter thereon can be manufactured stably.

28 Claims, 13 Drawing Sheets

LIQUID CRYSTAL DISPLAY ELEMENT AND MANUFACTURING METHOD THEREOF INCLUDING APPLYING BOTH UV AND IR LIGHT TO THE SEAL

FIELD OF THE INVENTION

The present invention relates to an LCD (Liquid Crystal Display) element for displaying data including characters and images and the manufacturing method thereof, and more particularly, to an LCD element comprising a lamination of substrates made of different materials such as glass and plastics and the manufacturing method thereof.

BACKGROUND OF THE INVENTION

An LCD element comprises two substrates, each including transparent electrodes provided through patterning and being orientated. To manufacture the LCD element, two substrates are laminated first by means of a sealing agent in such a manner that the orientation-treated surfaces oppose each other, and thence the liquid crystal is filled between the substrates.

At least one of the substrates is a transparent substrate made of glass, plastics, ceramics, etc. and the sealing agent is selected depending on the substrates.

Generally, a sealing agent made of thermosetting resin is used to laminate glass substrates. The substrates laminated by the sealing agent are subject to heating at 100° centigrade or higher for several hours to set the sealing agent and bond to the glass substrates.

Since the glass substrates are thick, heavy, and fragile compared with plastic substrates, it is more effective to use the plastic substrates instead. For example, Japanese Laid-Open Patent Application No. 4-242717/1992 discloses a method for forming a thin-film-layer device driving the liquid crystal on a plastic film substrate.

With this method, however, the plastic film substrate deforms by the heat generated when the active elements serving as the device are sequentially layered thereon through sputtering or the like. This presents a problem that it is difficult to form the active elements of a miniature structure on the plastic film substrate, and that the active elements break when the plastic film substrate curls due to the heat. In other words, the plastic substrate is inferior to the glass substrate in terms of heat-resistance.

To eliminate this drawbacks, Japanese Laid-Open Patent Application No. 4-238322/1992 discloses a method for laminating the plastic film substrate to the glass substrate on which the active elements are formed. Accordingly, the benefits of an LCD element comprising the glass and plastic substrates, or a pair of substrates made of different materials, that is to say, the benefits obtained by utilizing only the advantages of each materials, have been acknowledged and such an LCD element is expected to be improved further.

However, it should be noted that accuracy of lamination is an import factor when laminating the glass and plastic substrates, or a pair of substrates made of different materials.

To be more specific, when a thermosetting sealing agent is used, the substrates laminated with the sealing agent is subject to heat treatment at 100° centigrade or higher, and the plastic and glass substrates have the linear expansion coefficients of $3-8\times10^{-5}$ and $3-8\times10^{-6}$, respectively. Thus, such a considerable difference of the linear expansion coefficient causes a problem that the lamination accuracy is degraded.

Also, when the plastic substrate bonds to the glass substrate by means of the seal agent, it also expands by the heat applied to set the sealing agent. Since the plastic substrate contracts more than the sealing agent when cooled, the sealing agent develops a tension with respect to the plastic substrate. This generates residual stress within the substrates and the interfaces between the sealing agent and substrates, which causes a problem that the substrates are damaged or separated from a seal.

As has been explained, the above problems make it impossible to laminate the plastic and glass substrates accurately with the thermosetting sealing agent, and thus an LCD element comprising the lamination of the plastic and glass substrates can not be manufactured stably.

On the other hand, Japanese Laid-Open Patent Application No. 3-83012/1991 discloses a method of using a sealing agent made of ultraviolet-ray setting resin which is set when irradiated by an ultraviolet ray at room temperature. However, the radiant heat of an ultraviolet ray source such as a mercury lamp or metal halide lamp heats the substrates when setting the sealing agent. This develops residual stress on the interfaces between the sealing agent and substrates, thereby presenting a problem that the adhesion degrades.

Besides, the ultraviolet-ray setting resin has less adhesion than the thermosetting resin. Thus, the adhesion of the ultraviolet-ray setting resin is sufficient to laminate the substrates of the same material, i.e., a pair of glass substrates or a pair of plastic substrates, but it is insufficient to laminate the substrates of different materials, i.e., a pair of plastics and glass substrates.

Alternately, a fast acrylic-based adhesive agent which is set when irradiated by a laser beam is introduced in "High-Polymer New Material, One Point-18, High-Performance Adhesive/Pressure Sensitive Adhesive Agent", Feb. 20, 1989, Kyoritsu Publishing Co., Ltd. To set this adhesive agent made of ultraviolet-ray setting resin, an ultraviolet laser beam is used as the light source.

When the agent is set by the ultraviolet laser beam, the residual stress, which is caused by the difference of the linear expansion coefficients, will not be developed within the substrates and on the interfaces between the substrates and sealing agent. As a result, the LCD element thus formed is more resistant to separation than the one formed using the general ultraviolet-ray source. However, since the ultraviolet-ray setting resin has less adhesion, the sealing agent made of the same does not render a sufficient sealing strength.

Also, Japanese Laid-Open Patent Application No. 5-273563/1993 discloses a sealing agent made of a mixture of the ultraviolet-ray setting resin and thermosetting resin to upgrade the adhesion. The ultraviolet ray is irradiated first to set the ultraviolet-ray setting resin to bond the lamination of the substrates, and then the heat is applied to set the thermosetting resin to upgrade the adhesion.

However, when laminating the plastic and glass substrates, the plastic substrate expands while the heat is applied to set the thermosetting ingredient. Under these conditions, there occurs a problem that the plastic substrate separates from the seal because the adhesion of the sealing agent is weaker than the stress caused by the thermal expansion of the plastic substrate.

A sealing agent made of two kinds of liquid, one made of a principle material and the other is made of a setting agent, may be used. However, this sealing agent has the following problems:

1) it is not easy to mix the two kinds of liquid in an adequate ratio;
2) the resulting sealing agent is not easy to handle; and 3) the unreacted setting agent reacts with the liquid crystal materials.

SUMMARY OF THE INVENTION

It is therefore the object of the present invention to provide an LCD element comprising a lamination of two substrates which can upgrade the adhesion of a seal to the substrates to a strength that has never been achieved by the conventional method using the irradiation of the ultraviolet rays at room temperature to set the ultraviolet-ray setting sealing, whereby the damages to the substrates and the separation from the seal can be prevented even when each substrate is made of a different material and the difference of the linear expansion coefficients between the substrates is considerable, and the manufacturing method thereof.

The above and other objects can be fulfilled by a method of manufacturing an LCD element comprising:

a first step of interposing a photosetting bonding material as a sealing agent between a plastic substrate and a glass substrate; and a second step of bonding the plastic substrate and the glass substrate by setting the photosetting bonding material by irradiating a first laser beam and a second laser beam to the photosetting bonding material simultaneously, the first laser beam having an oscillating wave length within an ultraviolet region, the second laser having an oscillating wave length from 600 nm to 0.1 mm inclusive.

According to the above method, the photosetting bonding material increases the fluidity when heated by the irradiation of the second laser beam. Accordingly, the photosetting bonding material flows readily into the concavities on the surface of each substrate at the interfaces with the photosetting bonding material, thereby bringing the photosetting bonding material to have a contact to each substrate in a broader area.

Under these conditions, when the photosetting bonding material is irradiated by the first laser beam, myriads molecules thereof are excited and the photopolymerization is activated. Thus, the photosetting bonding material sets faster and the plastic and glass substrates bond to each other by means of the photosetting bonding material. Note that the photosetting bonding material is heated by irradiation of the second laser beam at the same time and the photopolymerization is accelerated to be completed.

Since the photosetting bonding material has a contact to each substrate in a broader area and the photopolymerization is completed, the plastic and glass substrates bond to each other more tightly by means of the photosetting bonding material.

The second laser beam does not heat the plastic and glass substrates when it passes through the same, which prevents the change of the substrates in position, that is to say, a problem that occurs when the lamination of the plastic and glass substrates bonded by means of the photosetting bonding material is heated because of the considerable difference in the linear expansion coefficient.

Accordingly, eliminating the above problem not only makes it possible to bond the plastic and glass substrates accurately by means of the photosetting bonding material, but also causes substantially no stress between the photosetting bonding material and each substrate. Thus, the photosetting bonding material bonds the plastic and glass substrates more tightly.

As has been explained, the above method facilitates and stabilizes the manufacturing of the LCD element comprising two substrates, such as the plastic and glass substrates, whose linear expansion coefficients differ considerably.

The above and other object can also be fulfilled by an LCD element comprising a plastic substrate and a glass substrate and liquid crystal filled therebetween, the plastic and glass substrates opposing each other in parallel with a gap therebetween, wherein:

the LCD element includes a sealing agent as a set photosetting bonding material between the plastic and glass substrates; and the plastic substrate absorbs a beam of light a little when transmitting the beam of light whose wave length is within an infrared region, the beam of light being irradiated to heat the photosetting bonding material.

According to the above structure, the beam of light heats the photosetting bonding material while curbing the heating to the plastic substrate when passing through the same. Accordingly, the photosetting bonding material increases the fluidity and bonds to each substrate closer, thereby bonding the plastic and glass substrates more tightly.

Since the plastic and glass substrates, or a pair of substrates made of different materials, can be bonded tightly, only the advantages of each material can be utilized efficiently.

As a result, the active elements for the LCD and a color filter can be formed on the glass and plastic substrates, respectively, and the resulting LCD element is thin, light and has excellent visual recognition.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) is a longitudinal cross sectional view showing a state when two kinds of rays are irradiated in the same direction; FIG. 1(b) is a longitudinal cross sectional view showing a state when two kinds of rays are irradiated in their respective directions.

DESCRIPTION OF THE EMBODIMENTS

[First Embodiment]

The first embodiment of the present invention will be explained while referring to FIGS. 1(a) through 6 and 13 through 16.

Figure 2:
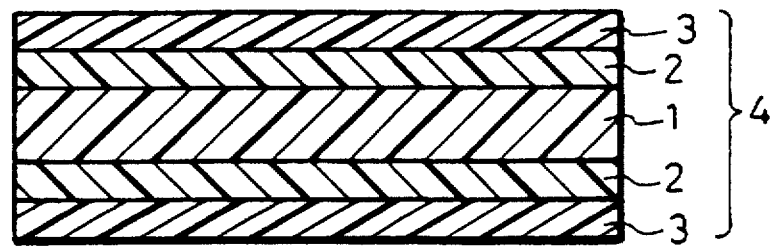
FIG. 2 is a longitudinal cross sectional view depicting the structure of a plastic substrate in accordance with the first through third embodiments of the present invention.
Figure 3:
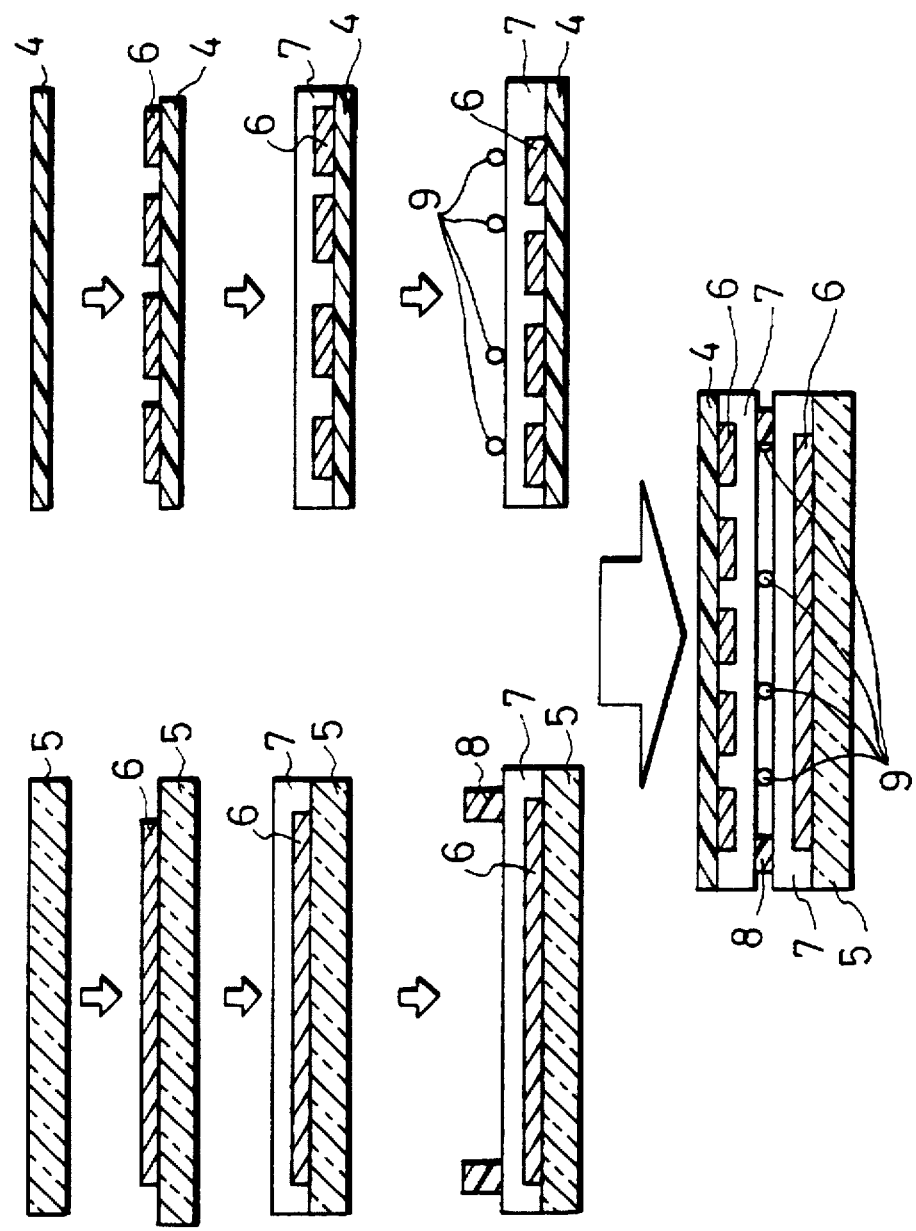
FIG. 3 is a longitudinal cross sectional view showing all the steps in the LCD element manufacturing method in accordance with the first through third embodiments of the present invention and first through fifth comparative examples.

An LCD element in accordance with this embodiment comprises a plastic substrate 4 and a glass substrate 5 shown in FIGS. 2 and 3, respectively. As shown in FIG. 2, the plastic substrate 4 has a base material 1 made of polyarylate (PAR) of, for example, 0.1 mm in thickness, whose main surfaces are coated with a gas-transmission preventing coat 2 which is coated with a hard coat 3; both the gas-transmission preventing coat 2 and hard coat 3 are mainly made of polyvinyl alcohol. The glass substrate 5 in FIG. 3 is, for example, 1.0 mm thick.

The LCD element manufacturing method of the present invention follows the conventional one. To be more precise, a transparent conducting film is formed on each of the substrates 4·5, and transparent electrodes 6 for a given simple matrix LCD element are formed thereon by patterning, then an orientation film 7 is layered on the transparent electrodes 6 and the orientation treatment is applied to the orientation film 7. A color filter may be placed on the plastic substrate 4 during this process. A seal 8 made of ultraviolet setting resin whose principal material is acrylic resin is formed on the glass substrate 5 after the orientation treatment. The seal 8 is a narrow strip made by drawing a predetermined pattern by the screen process printing or the dispenser. On the other hand, spacers 9 are placed apart each other on the plastic substrate 4.

Then, the plastic substrate 4 and glass substrate 5 are laminated by means of the seal 8 in such a manner that their respective orientation films 7 oppose each other. Then, as shown in FIG. 1(a), the plastic substrate 4 is pressed toward the glass substrate 5 at a pressing pressure of 1.0 kg/cm$^2$ using a press device one of whose press boards is a quartz board 10 to make the gap between the substrates 4·5 even. At this point, as shown in FIG. 4(a), the seal 8, which is a liquid before it sets, does not flow into minute concavities 15 on both the substrates 4·5. Both the press boards of the press device may be the quartz board 10 as shown in FIG. 1(b).

Then, as shown in FIG. 1(a), while the substrates 4·5 are being pressed in the direction of thickness, a xenon fluorine excimer laser beam 12 (wave length: 351 nm, output: 60 mJ/cm$^2$) emanated from an excimer laser 11 (model: L4500 of Hamamatsu Photonichs) and a carbon dioxide gas laser beam 14 (wave length: 10.6 μm, output: 3 W) emanated from a carbon dioxide gas laser emitter 13 (model: 48G-1-28 of Syndrad) are made into a circular spot of 3 mm in diameter to be irradiated simultaneously to the seal 8 from the side of the quartz board 10 at room temperature.

Figure 4:
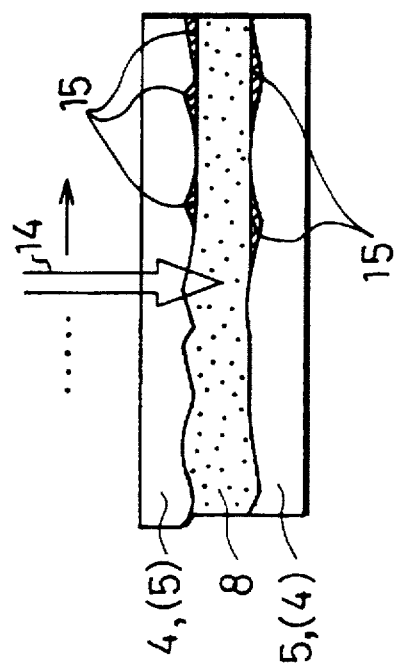
FIGS. 4(a) and (b) are longitudinal cross sectional views showing the state of a seal in minute concavities at the joint of the plastic and glass substrates in accordance with the first and third embodiments of the present invention.
Figure 4:
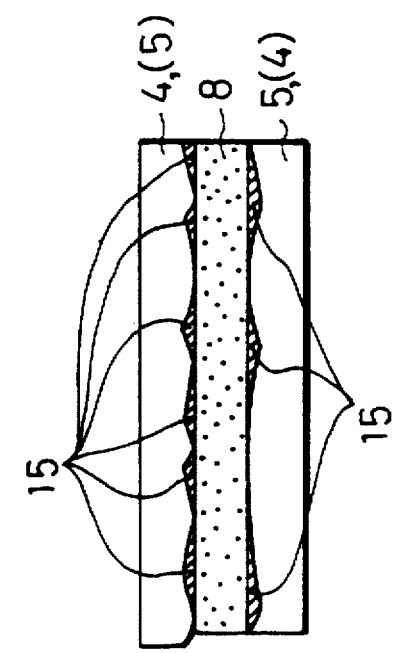

Under these conditions, the seal 8 absorbs the carbon dioxide gas laser beam 14 a little, and the dioxide gas laser beam 14 heats the seal 8 at the instance of absorption. Accordingly, the viscosity of the seal 8 lowers as the temperature rises, and the seal 8 flows more easily. Thus, as shown in FIG. 4 (b), the pre-setting liquid seal 8 flows readily into the minute concavities 15 on the substrates 4·5. As a result, the seal 8 has a contact to each substrate in a broader area and makes the contact to the same closer. When the excimer laser beam 12 is irradiated to the seal 8 under these conditions, the seal 8 is set through photopolymerization and bonds to both the substrates 4·5.

Although the temperature rises locally when the carbon dioxide gas laser beam 14 is irradiated and passes through the substrates 4·5, neither substrate is heated. Also, as previously mentioned, the carbon dioxide gas laser beam 14 and the excimer laser beam 12 are irradiated simultaneously, so that the heating the seal 8 by the former accelerates the photopolymerization by the latter, thereby ensuring the complete photopolymerization and hence making the seal 8 stronger.

Figure 5:
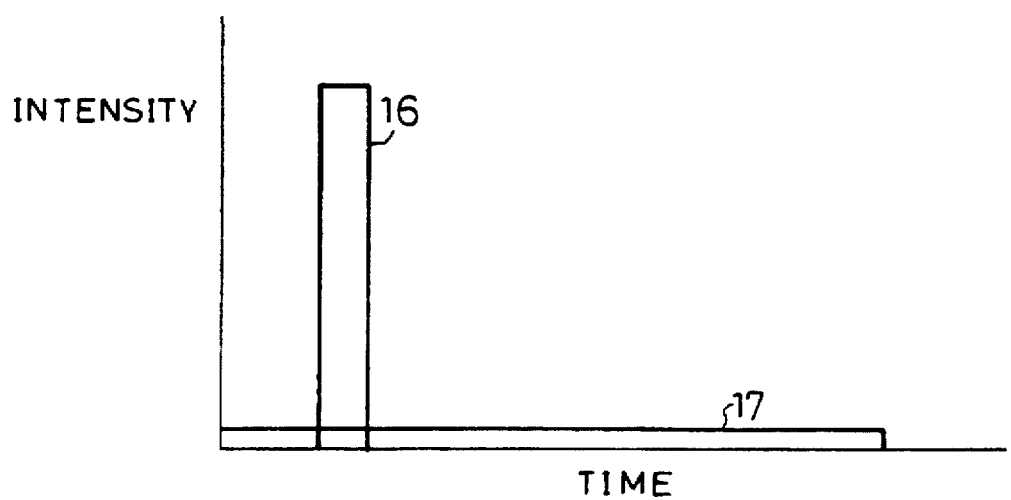
FIG. 5 is a graph showing the intensity characteristics of a ray irradiated to the joint in the steps of FIG. 1(a) or 1(b).

The excimer laser beam 12 emits a pulse-wise beam of light 16 shown in FIG. 5 with a periodic time up to 20 ns to irradiate a myriad of light quantum having a wave length of 351 nm to the seal 8 in a very short time (20 ns). Therefore, unlike the method to irradiate the light quantum for a long time by irradiating an ultraviolet ray 17 from a general ultraviolet ray source, the excimer laser beam 12 gets a great amount of seal-material-forming molecules excited where it is irradiated. The molecules thus excited accelerate not only the photopolymerization between resins, but also the chemical reaction between the seal 8 and the substrates 4·5. Thus, the bond between the seal 8 and the substrates 4·5 becomes stronger than by irradiating the ultraviolet ray 17 from the general ultraviolet-ray source.

If both the press boards of the press device are the quartz boards 10 as shown in FIG. 1(b), one of the excimer laser beam 12 and carbon dioxide gas laser beam 14 is irradiated either upward or downward while the other laser beam is irradiated in the other direction, so that the laser beams 12·14 sandwich the substrates 4·5. To draw a predetermined pattern on the seal 8 alone, the laser beam 12·14 are irradiated to a fixed point while the press boards 10 are moved horizontally in two dimensions while pressing the substrates 4·5.

Figure 6:
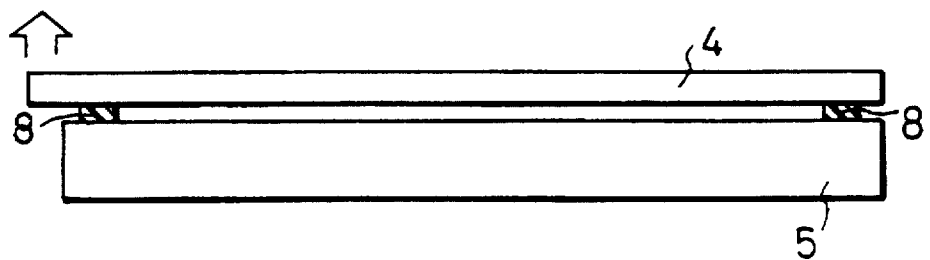
FIG. 6 is a view explaining the state when a force such that separates the plastic substrate bonded to the glass substrate through the steps in FIG. 1(a) or 1(b) is applied on the edge thereof.

The LCD element thus laminated renders a seal strength to withstand a rupture strength up to 20 kg/mm. If someone tries to separate the plastic substrate 4 from the edge as shown in FIG. 6 with a strength above 20 kg/mm, either the 0.1 mm-thick plastic substrate 4 breaks while leaving the seal 8, or the glass substrate 5 shatters. Thus, the separation of the substrates 4•5 from the seal 8 can be prevented with this LCD element. In addition, since the laser beam 12 within the ultraviolet region is irradiated only to the seal 8, the orientation films 7 remain intact, thereby preventing a failed orientation of the liquid crystal when it is filled between the substrates 4•5.

The above method facilitates and stabilizes the manufacturing of the LCD element comprising a lamination of the glass substrate and the plastic substrate made of, for example, polyarylate (PAR) of 0.1–0.5 mm in thickness whose linear expansion coefficient differs considerably from that of the glass substrate, or the plastic substrate with a color filter formed thereon, which had never been realized easily.

The carbon dioxide gas laser beam 14 is used herein; however, any laser beam whose oscillating wave length is from 600 nm to 0.1 nm inclusive in the infrared region, such as a helium neon laser beam and a $Nd^{3+}$ dope YAG(Yttrium-Aluminium-Garnet) laser beam, or a semi-conducting laser beam whose wave length is 680 nm, 780 nm, or 830 nm may be used instead.

The base material 1 of the plastic substrate 4 is not necessarily made of polyarylate as is in this embodiment, and it may be made of polycarbonate (PC), polyethylene terephthalate (PET), polyether sulfone (PES), heat-resistant acrylic, or epoxy resin.

Figure 13:
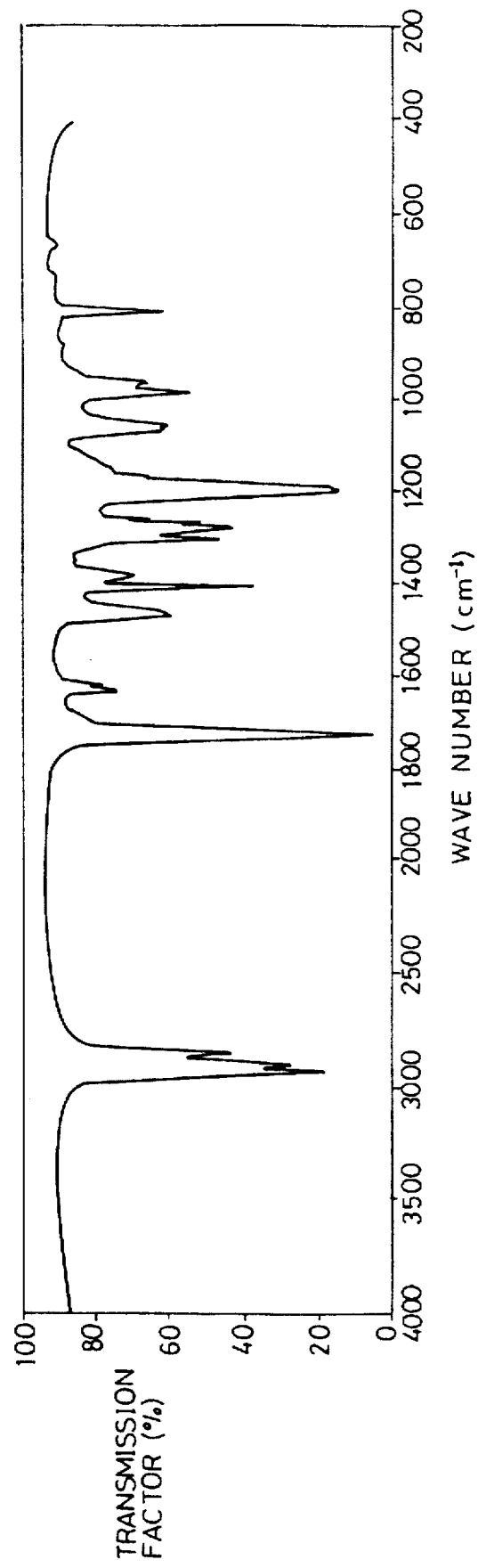
FIG. 13 is a graph showing an infrared spectrum of a pre-setting seal of the LCD elements in accordance with the first embodiment.

FIG. 13 shows an infrared spectrum of the pre-setting seal 8, and the graph reveals that the seal 8 is heated by the carbon dioxide gas laser beam 14.

Figure 14:
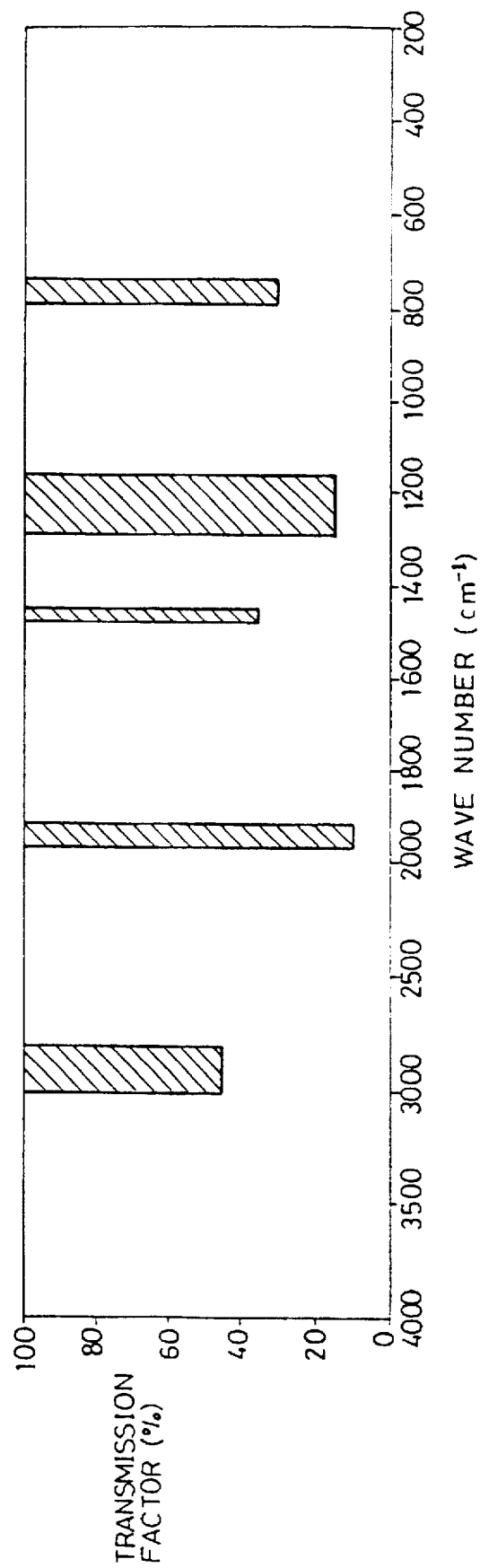
FIG. 14 is a graph showing an infrared spectrum of a heat-resistant acrylic resin used as an example of the plastic substrate.
Figure 15:
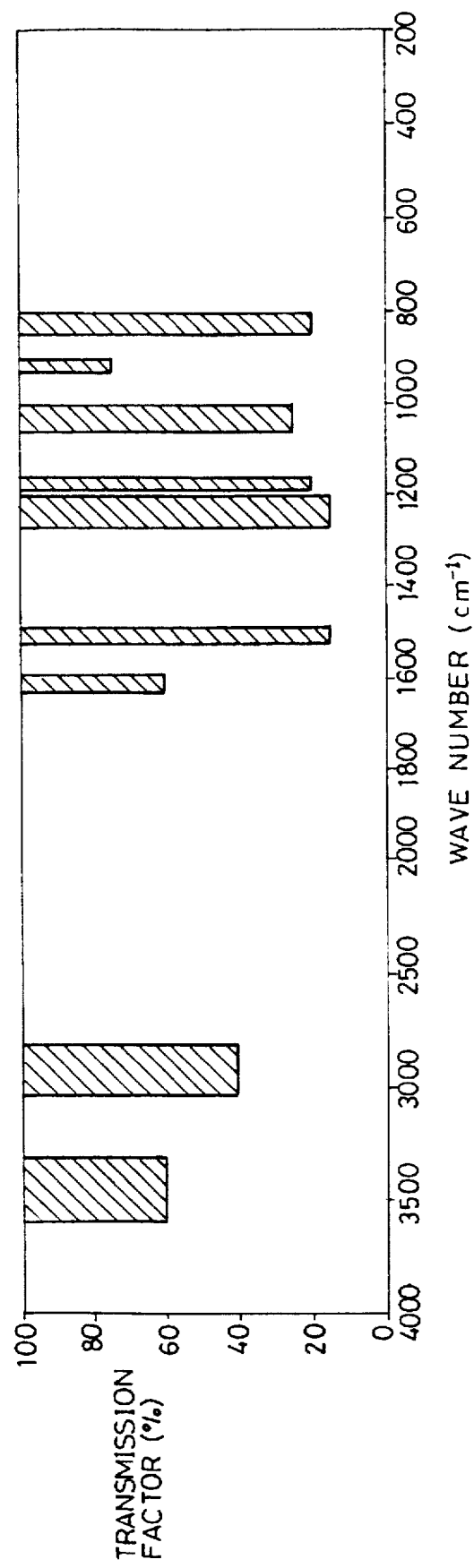
FIG. 15 is a graph showing an infrared spectrum of an epoxy resin used as an example of the plastic substrate.

As an evidence of the fact that the plastic substrate 4 does not absorb the beam of light from the carbon dioxide gas laser beam 14, FIGS. 14 and 15 show the infrared spectrum of the heat-resistant acrylic resin and epoxy resin, respectively. It is understood from these graphs that the plastic substrate 4 is not heated by the carbon dioxide gas laser beam 14. In the drawings, the range of wave number absorbing the infrared ray and the absorption intensity are indicated by shaded bands.

Figure 16:
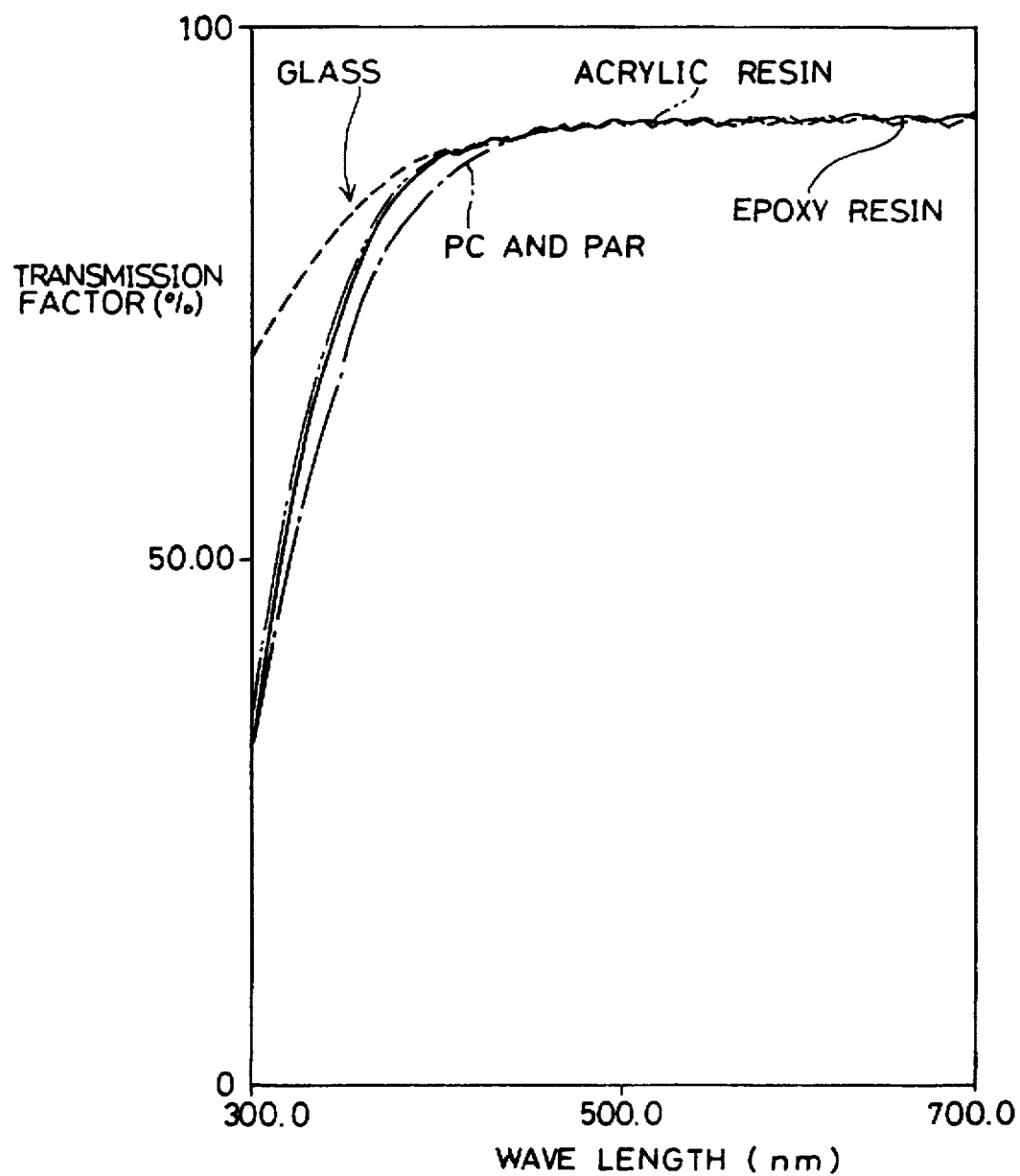
FIG. 16 is a graph showing ultraviolet transmission characteristics of the glass and plastic substrates.

FIG. 16 shows the ultraviolet ray transmission factor of the plastic substrate 4 and glass substrate 5. The graph reveals that the plastic substrate 4 and glass substrate 5 transmit the ultraviolet ray from the xenon fluorine excimer laser beam 12. It is well known that the quarts transmits both the infrared and ultraviolet rays well.

[Second Embodiment]

Figure 1:
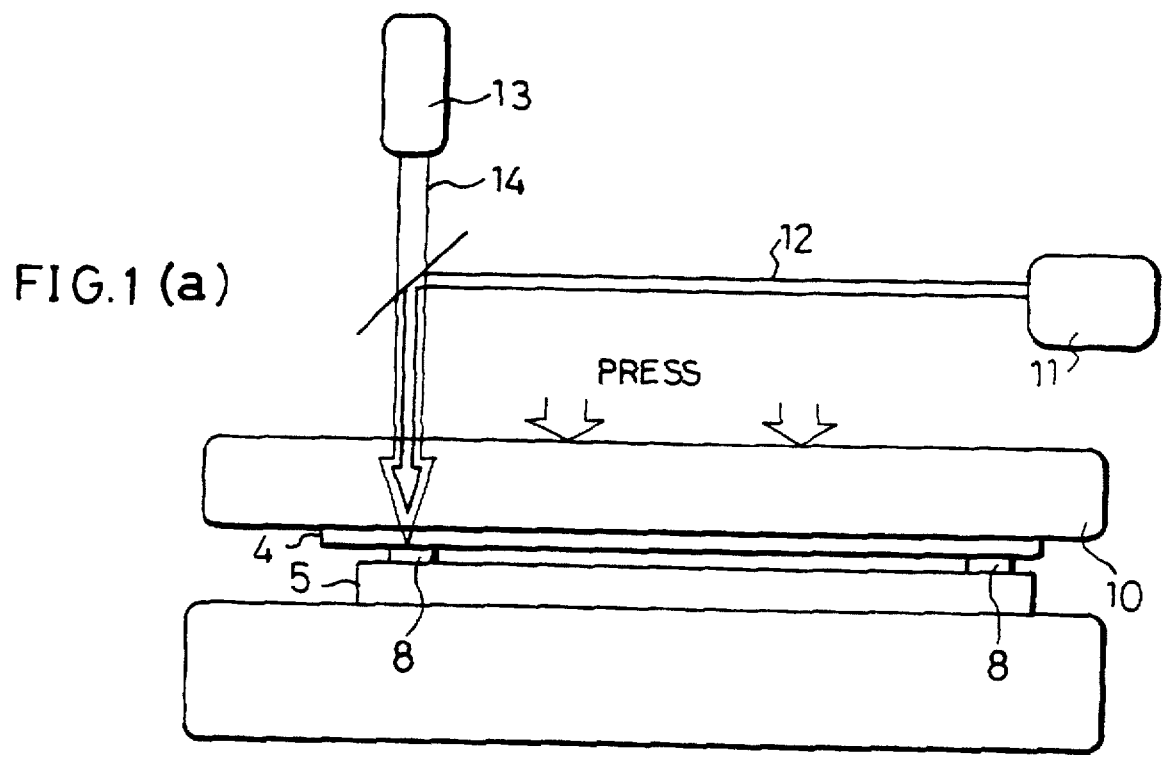
FIGS. 1(a) and 1(b) show a process to bond a plastic substrate and a glass substrate in the manufacturing method of an LCD element in accordance with first through third embodiments of the present invention.
Figure 1:
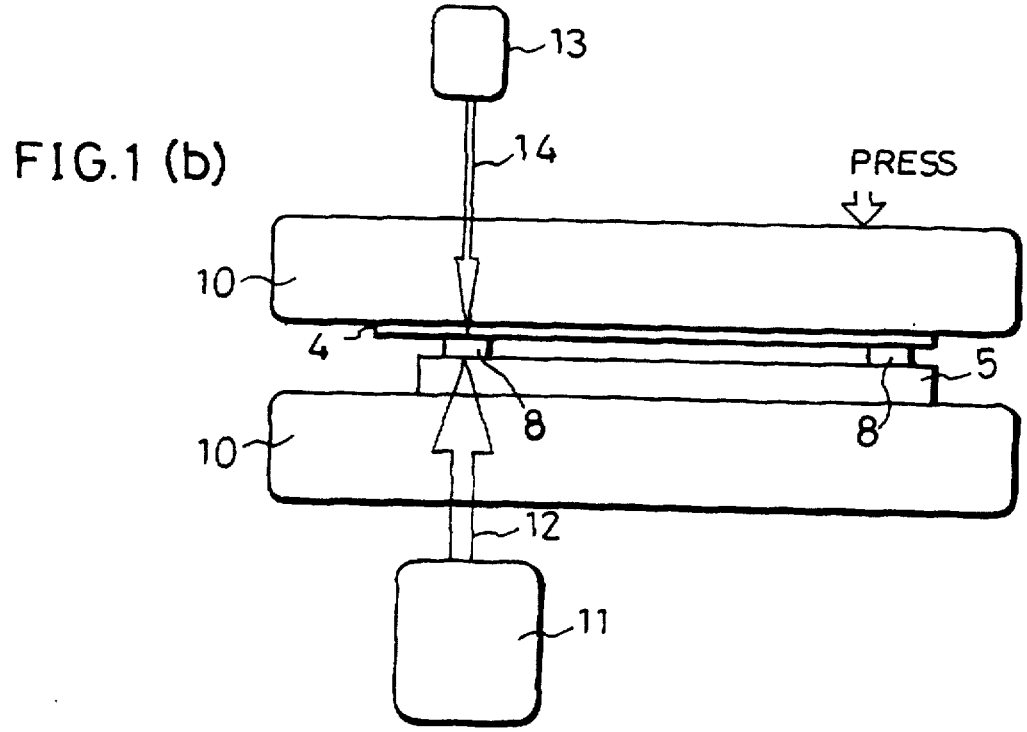

Another embodiment of the present invention will be explained while referring to FIGS. 1(a) or 1 (b), 3, and 6. For the explanation's convenience, like components are labeled with like numerals with respect to the first embodiment and the explanation thereof is omitted.

The LCD element of the second embodiment is of the same structure as that of the first embodiment except that stripewise-aligned transparent electrodes and two-terminal element MIM's (Metal Insulator Metals) are formed respectively on the plastic substrate 4 and the glass substrate 5 shown in FIG. 3. The substrates 4•5 are laminated in the same manner as the first embodiment as shown in FIG. 1(a) or 1(b).

The LCD element thus laminated renders a seal strength to withstand the rupture strength up to 20 kg/mm. If someone tries to separate the plastic substrate 4 from the edge as shown in FIG. 6 with a strength above 20 kg/mm, either the plastic substrate 4 breaks while leaving the seal 8, or the glass substrate 5 shatters. Thus, the separation of the substrates 4•5 from the seal 8 can be prevented with this LCD element.

In addition, since the laser beam 12 within the ultraviolet region is irradiated only to the seal 8, the orientation films 7 remain intact, thereby preventing a failed orientation of the liquid crystal when it is filled between the substrates 4•5.

The active LCD element thus obtained is thinner and lighter than the one comprising two glass substrates 5. Also, since the plastic substrate 4 is a thin film, the visual recognition of the resulting LCD element is upgraded when used as a reflecting type. In addition, because the substrate 4 is made of plastics, forming a stylus input device thereon causes only a minor parallax error.

Also, the active LCD element of the second embodiment can eliminate the problems presented when the active LCD element comprises two plastic substrates 4: separation of the active elements from the plastic substrates 4; and the misalignment of the plastic substrates 4 due to irregular contraction of the same when forming the two-terminal element MIM's. Also, since the plastic substrate 4 and glass substrate 5 are laminated at room temperature, substantially no stress will be developed with respect to the plastic substrate 4 and the substrates 4•5 are laminated with substantially no misalignment; for it is the temperature change that causes the stress and misalignment. As a result, the lamination accuracy can be upgraded.

[Third Embodiment]

Another embodiment of the present invention will be explained while referring to FIGS. 1(a) or 1(b), 3, and 6. For the explanation's convenience, like components are labeled with like numerals with respect to the first embodiment and the explanation thereof is omitted.

The LCD element of the third embodiment is of the same structure as that of the first embodiment except that a transparent conducting film is formed to cover the plastic substrate 4 entirely, and that three-terminal element TFT's (Thin Film Transistors) are formed on the glass substrate 5. The substrates 4•5 are laminated in the same manner as the first embodiment as shown in FIG. 1(a) or 1(b).

The LCD element thus laminated renders a seal strength to withstand the rupture strength up to 20 kg/mm. If someone tries to separate the plastic substrate 4 from the edge as shown in FIG. 6 with a strength above 20 kg/mm, either the plastic substrate 4 breaks while leaving the seal 8, or the glass substrate 5 shatters. Thus, the separation of the substrates 4•5 from the seal 8 can be prevented with this LCD element.

In addition, since the laser beam 12 within the ultraviolet region is irradiated only to the seal 8, the orientation films 7 remain intact, thereby preventing a failed orientation of the liquid crystal when it is filled between the substrates 4•5.

The active LCD element thus obtained is thinner and lighter than the one comprising two glass substrates 5. Also, since the plastic substrate 4 is a thin film, the visual recognition of the resulting LCD element is upgraded when used as a reflecting type.

Also, the active LCD element of the third embodiment can eliminate the problems presented when the active LCD element comprises two plastic substrates 4: separation of the active elements from the plastic substrates 4; and the misalignment of the plastic substrates 4 due to irregular contraction of the same when forming the three-terminal elements TFT's at high temperature.

In addition, since the plastic substrate 4 and glass substrate 5 are laminated at room temperature, the stress caused by the temperature change will not be developed with respect to the plastic substrate 4, thereby upgrading the bonding strength between the substrates 4•5. Further, since misalignment caused by heating the substrates 4•5 will not occur, the lamination accuracy can be upgraded.

The xenon fluorine excimer laser beam 12 is used to irradiate the ultraviolet ray in the first through third embodiments; however, any laser beam that can set the seal 8 and pass through both the plastic substrate 4 and glass substrate 5 may be used instead.

However, it is preferable that the laser beam has the oscillating wave length from 300 nm to 400 nm inclusive, more preferably from 330 nm to 370 nm, and most preferably from 340 nm to 360 nm. This is because the laser beam having the wave length within the above range not only sets the seal 8 but also passes through the plastic substrate 4 and glass substrate 5 efficiently. Thus, the attenuation of the laser beam when passing through the substrates 4•5 can be curbed, thereby setting the seal 8 more efficiently.

For further understanding of the effects of the present invention, five comparative examples will be explained while referring to FIGS. 3 and 7 through 12. For explanation's convenience, like components are labeled with like numerals with respect to the first through third embodiments and the explanation thereof is omitted.

[First Comparative Example]

The LCD element of the first comparative example is of the same structure as that of the first embodiment. However, the substrates 4•5 are laminated in a different manner.

The method of manufacturing the LCD element of the first comparative example will be explained in detail.

Figure 7:
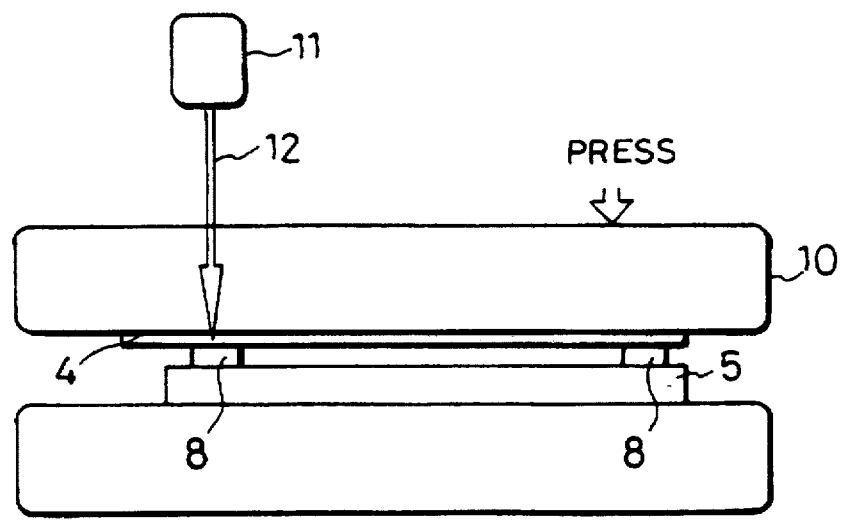
FIG. 7 is a longitudinal cross sectional view showing the steps to bond the plastic and glass substrates in the LCD element manufacturing method in accordance with a first comparative example.

As shown in FIG. 3, the plastic substrate 4 and glass substrate 5 are laminated by means of the seal 8 made of ultraviolet-ray-setting resin whose principal material is acrylic resin. Then, as shown in FIG. 7, the plastic substrate 4 is pressed at a pressing pressure 1.0 kg/cm² by the press device one of whose press boards is the quartz board 10 to make the gap between the substrates 4•5 even. While the substrates 4•5 are being pressed, the xenon fluorine excimer laser beam 12 emanated from the excimer laser 11 is focused to a small cross section of 3 mm in diameter and irradiated to the seal 8 from the side of the quarts board 10 at room temperature to bond the same to the substrates 4•5.

Figure 8:
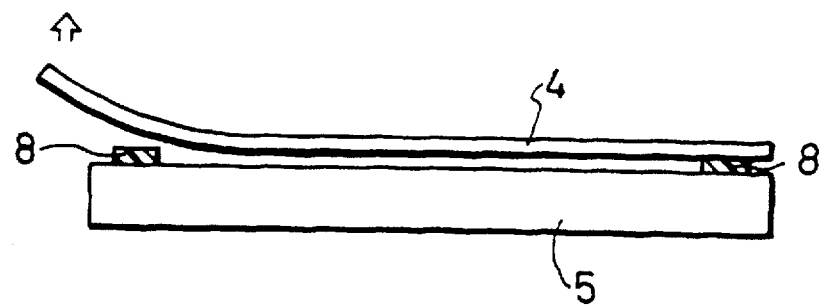
FIG. 8 is a view explaining the state when a force such that separates the plastic substrate bonded to the glass substrate through the steps in accordance with first through fifth comparative examples is applied on the edge thereof.

With the LCD element thus laminated, the plastic substrate 4 separates from the seal 8 as shown in FIG. 8 when one tries to separate the same from the edge thereof at a strength of 6 kg/mm. This means that sealing strength of the LCD element of the first comparative example is not more than 30% of that of the LCD element of the first embodiment. However, note that since the laser beam 12 within the ultraviolet region is irradiated only to the seal 8, the orientation films 7 remain intact, thereby preventing a failed orientation of the liquid crystal when it is filled between the substrates 4•5.

[Second Comparative Example]

The LCD element of the second comparative example is of the same structure as that of the first embodiment. However, the substrates 4•5 are laminated in a different manner.

The method of manufacturing the LCD element of the second comparative example will be explained in detail.

Figure 9:
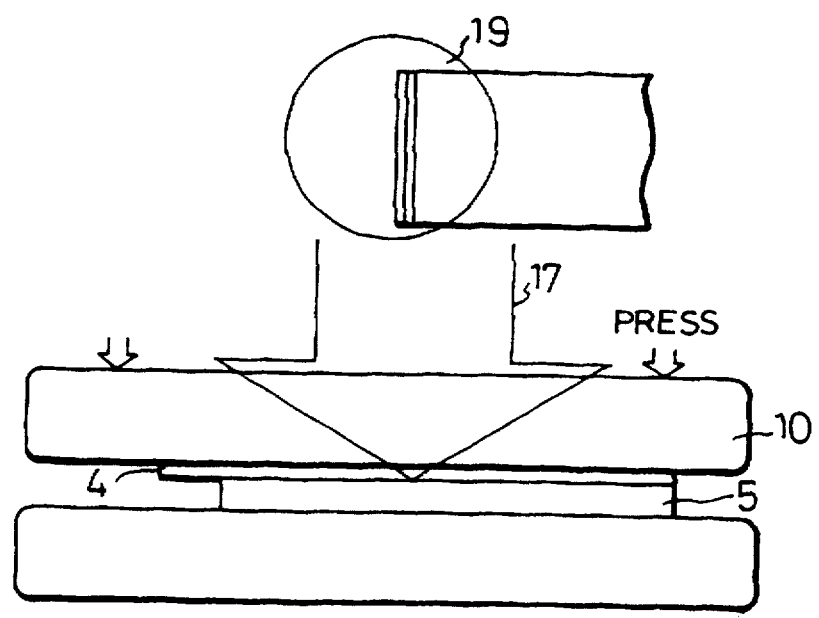
FIG. 9 is a longitudinal cross sectional view showing the steps to bond the plastic and glass substrates in the LCD element manufacturing method in accordance with a second comparative example.

As shown in FIG. 3, the plastic substrate 4 and glass substrate 5 are laminated by means of the seal 8 made of ultraviolet-ray-setting resin whose principal material is acrylic resin. Then, as shown in FIG. 9, the plastic substrate 4 is pressed at a pressing pressure 1.0 kg/cm² by the press device one of whose press boards is the quartz board 10 to make the gap between the substrates 4•5 even. While the substrates 4•5 are being pressed, the general ultraviolet ray 17 (2.0 J/cm²) is irradiated across the plastic substrate 4 from a 500 W metal halide lamp 19 to set the seal 8 to bond the same to the substrates 4•5.

With the LCD element thus laminated, the plastic substrate 4 separates from the seal 8 as shown in FIG. 8 when one tries to separate the same from the edge thereof at a strength of 4 kg/mm. This means that the sealing strength of the LCD element of the second comparative example is not more than 20% of that of the LCD element of the first embodiment. Moreover, since the ultraviolet ray 17 is irradiated to the area other than the seal 8, the orientation of the liquid crystal fails when it is filled between the substrates 4•5, the reason of which is assumed to be some affect on the orientation films 7 by the ultraviolet ray 17.

[Third Comparative Example]

The LCD element of the third comparative example is of the same structure as that of the first embodiment. However, the substrates 4•5 are laminated in a different manner.

The method of manufacturing the LCD element of the third comparative example will be explained in detail.

Figure 10:
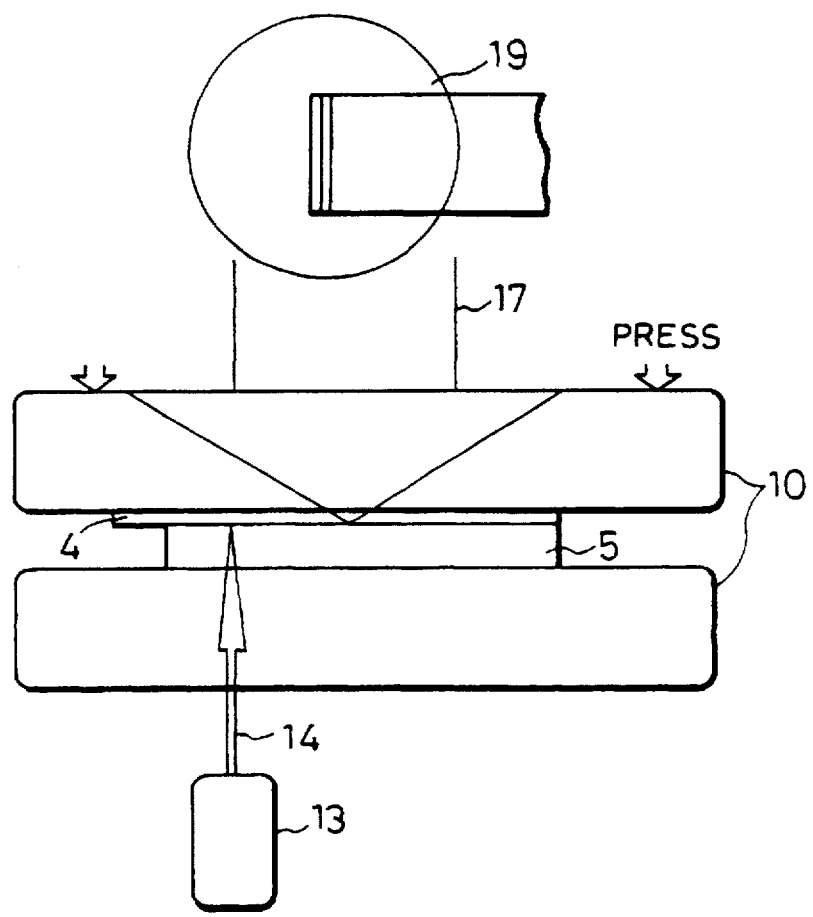
FIG. 10 is a longitudinal cross sectional view showing the steps to bond the plastic and glass substrates in the LCD element manufacturing method in accordance with a third comparative example.

As shown in FIG. 3, the plastic substrate 4 and glass substrate 5 are laminated by means of the seal 8 made of ultraviolet-ray-setting resin whose principal material is acrylic resin. Then, as shown in FIG. 10, the plastic substrate 4 is pressed at a pressing pressure 1.0 kg/cm² by the press device both of whose press boards are the quartz boards 10 to make the gap between the substrates 4•5 even. While the substrates 4•5 are being pressed, the general ultraviolet ray 17 is irradiated across the plastic substrate 4 from the 500 W metal halide lamp 19, and at the same time, the carbon dioxide gas laser beam 14 emanated from the carbon dioxide gas laser emitter 13 is made into a circular spot of 3 mm in diameter and irradiated to the seal 8 through the glass substrate 5 to bond the same to the substrates 4•5.

With the LCD element thus laminated, the plastic substrate 4 separates from the seal 8 as shown in FIG. 8 when one tries to separate the same from the edge thereof at a strength of 7 kg/mm. This means that the sealing strength of the LCD element of the third comparative example is not more than 40% of that of the LCD element of the first embodiment. Moreover, since the ultraviolet ray 17 is irradiated to the area other than the seal 8, the orientation of the liquid crystal fails when it is filled between the substrates 4•5, the reason of which is assumed to be some affect on the orientation films 7 by the ultraviolet ray 17.

[Fourth Comparative Example]

The LCD element of the fourth comparative example is of the same structure as that of first embodiment. However, the substrates 4•5 are laminated in a different manner.

The method of manufacturing the LCD element of the fourth comparative example will be explained in detail.

Figure 11:
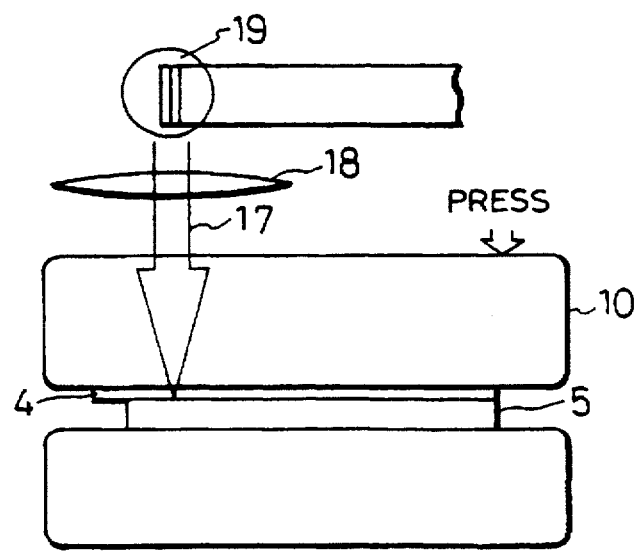
FIG. 11 is a longitudinal cross sectional view showing the steps to bond the plastic and glass substrates in the LCD element manufacturing method in accordance with a fourth comparative example.

As shown in FIG. 3, the plastic substrate 4 and glass substrate 5 are laminated by means of the seal 8 made of ultraviolet-ray-setting resin whose principal material is acrylic resin. Then, as shown in FIG. 11, the plastic substrate 4 is pressed at a pressing pressure 1.0 kg/cm² by the press device one of whose press boards is the quartz board 10 to make the gap between the substrates 4·5 even.

While the substrates 4·5 are being pressed, the general ultraviolet ray 17 from the 500 W metal halide lamp 19 is focused to a small cross section of 3 mm in diameter by means of a lens 18 and irradiated to the seal 8 alone to bond the same to the substrates 4·5.

With the LCD element thus laminated, the plastic substrate 4 separates from the seal 8 as shown in FIG. 8 when one tries to separate the same from the edge thereof at a strength of 6 kg/mm. This means that the sealing strength of the LCD element of the fourth comparative example is not more than 30% of that of the LCD element of the first embodiment.

However, note that since the ultraviolet ray 17 is irradiated only to the seal 8, the orientation films 7 remain intact, thereby preventing a failed orientation of the liquid crystal when it is filled between the substrates 4·5.

[Fifth Comparative Example]

The LCD element of the fifth comparative example is of the same structure as that of first embodiment. However, the substrates 4·5 are laminated in a different manner.

The method of manufacturing the LCD element of the fifth comparative example will be explained in detail.

Figure 12:
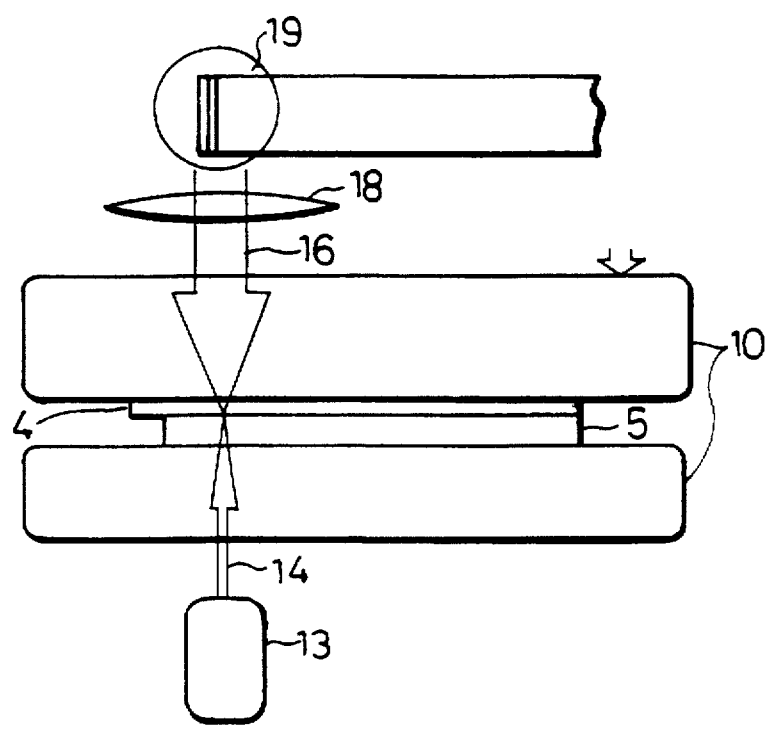
FIG. 12 is a longitudinal cross sectional view showing the steps to bond the plastic and glass substrates in the LCD element manufacturing method in accordance with a fifth comparative example.

As shown in FIG. 3, the plastic substrate 4 and glass substrate 5 are laminated by means of the seal 8 made of ultraviolet-ray-setting resin whose principal material is acrylic resin. Then, as shown in FIG. 12, the plastic substrate 4 is pressed at a pressing pressure 1.0 kg/cm² by the press device both of whose press boards are the quartz boards 10 to make the gap between the substrates 4·5 even.

While the substrates 4·5 are being pressed, the general ultraviolet ray 17 from the 500 W metal halide lamp 19 is focused to a small cross section of 3 mm in diameter by means of the lens 18 to be irradiated to the seal 8 alone, and at the same time, the carbon dioxide gas laser beam 14 emanated from the carbon dioxide gas laser emitter 13 is made into a circular spot of 3 mm in diameter and irradiated to the seal 8 to bond the same to the substrates 4·5.

With the LCD element thus laminated, the plastic substrate 4 separates from the seal 8 as shown in FIG. 8 when one tries to separate the same from the edge thereof at a strength of 9 kg/mm. This means that the sealing strength of the LCD element of the fifth comparative example is not more than 50% of that of the LCD element of the first embodiment.

However, note that since the ultraviolet ray 17 is irradiated only to the seal 8, the orientation films 7 remain intact, thereby preventing a failed orientation of the liquid crystal when it is filled between the substrates 4·5.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method of manufacturing a liquid crystal display element comprising:

a first step of interposing a photosetting bonding material as a sealing agent between a plastic substrate and a glass substrate; and a second step of bonding said plastic substrate and said glass substrate by setting said photosetting bonding material by irradiating a first laser beam and a second laser beam to said photosetting bonding material simultaneously, said first laser beam having an oscillating wave length within an ultraviolet region, said second laser having an oscillating wave length from 600 nm to 0.1 mm inclusive.

2. The method of claim 1 further comprising a third step of filling liquid crystal between said plastic substrate, said glass substrate, and said photosetting bonding material.

3. The method of claim 1, wherein said first laser beam sets said photosetting bonding material through photopolymerization and said second laser beam heats said photosetting bonding material when irradiated to said photosetting bonding material.

4. The method of claim 1, wherein said first and second laser beams are irradiated to said photosetting bonding material through said plastic substrate.

5. The method of claim 1, wherein said first and second laser beams are irradiated to said photosetting bonding material through said glass and plastic substrates, respectively.

6. The method of claim 1, wherein fluidity of said photosetting bonding material increases before it sets when heated by irradiation of said second laser beam, whereby said plastic and glass substrates bond to each other more tightly.

7. The method of claim 3, wherein the polymerization of said photosetting bonding material by irradiation of said first laser beam is accelerated when said photosetting bonding material is heated by said second laser beam.

8. The method of claim 1, wherein said first laser beam is irradiated continuously in pulse.

9. The method of claim 8, wherein said first laser beam is an excimer laser beam.

10. The method of claim 8, wherein said first laser beam is irradiated continuously in pulse with a periodic time up to 20 ns.

11. The method of claim 1, wherein said plastic and glass substrates are pressed in a direction of thickness thereof when said first and second laser beams are irradiated.

12. The method of claim 1, wherein said first laser beam is a xenon fluorine laser beam whose oscillating wave length is 351 nm.

13. The method of claim 1, wherein said second laser beam is a carbon dioxide gas laser beam whose oscillating wave length is 10.6 µm.

14. The method of claim 1, wherein said sealing agent is a narrow strip and spot diameters of said first and second laser beams are smaller than a width of said sealing agent, so that said first and second laser beams are irradiated on said strip sealing agent from one end to the other end in a longitudinal direction.

15. A method of manufacturing a liquid crystal display element comprising:

a first step of interposing a photosetting bonding material as a sealing agent between a plastic substrate and a glass substrate; and a second step of bonding said plastic substrate and said glass substrate by setting said photosetting bonding material by irradiating a first laser beam and a second laser beam to said photosetting bonding material simultaneously, said first and second laser beams having oscillating wave lengths within an ultraviolet region and an infrared region, respectively, said photosetting bonding material setting through photopolymerization when irradiated by said first laser beam, the oscillating wave length of said second laser beam being determined so as to be absorbed by said photosetting bonding material to heat the same while absorbed a little when passing through said plastic substrate.

16. A liquid crystal display element comprising a plastic substrate and a glass substrate and liquid crystal filled therebetween, said plastic and glass substrates opposing each other in parallel with a gap therebetween, wherein:

said liquid crystal display element includes as a sealing agent a set photosetting bonding material between said plastic and glass substrates; and said plastic substrate, when transmitting a beam of light whose wave length is within an infrared region, absorbs said beam of light in a smaller amount than said photosetting bonding material absorbs the same, said beam of light being irradiated to heat said photosetting bonding material.

17. The liquid crystal display element of claim 16, wherein said plastic substrate absorbs a beam of light, whose wave length is within an ultraviolet region, a little when transmitting the same, said beam of light being irradiated to set said photosetting bonding material through photopolymerization.

18. The liquid crystal display element of claim 16, wherein said glass substrate absorbs a beam of light, whose wave length is within an ultraviolet region, a little when transmitting the same, said beam of light being irradiated to set said photosetting bonding material through photopolymerization.

19. The liquid crystal display element of claim 16, wherein said glass substrate absorbs said beam of light a little when transmitting the same.

20. A liquid crystal display element comprising a plastic substrate and a glass substrate and liquid crystal filled therebetween, said plastic and glass substrates opposing each other in parallel with a gap therebetween, wherein the liquid crystal display element includes a seal surrounding the liquid crystal, said seal consisting of a photosetting bonding material, and wherein the seal can withstand a force up to 20 kg/mm exerted at the edge of the liquid crystal display element to separate the plastic substrate therefrom.

21. The liquid crystal display of claim 20, wherein the plastic substrate and the glass substrate do not suffer misalignment.

22. The liquid crystal display of claim 20, wherein the plastic substrate passes a light beam from an infrared laser efficiently.

23. The liquid crystal display of claim 20, wherein the plastic substrate passes a light beam from an ultraviolet laser efficiently.

24. The liquid crystal display of claim 20, wherein the glass substrate passes a light beam from an ultraviolet laser efficiently.

25. The liquid crystal display of claim 20, wherein the glass substrate passes a light beam from an infrared laser efficiently.

26. A liquid crystal display element comprising a plastic substrate and a glass substrate and liquid crystal filled therebetween, said plastic and glass substrates opposing each other in parallel with a gap therebetween, wherein the liquid crystal display element includes a seal surrounding the liquid crystal, said seal consisting of a photosetting bonding material;

wherein said plastic substrate or said glass substrate has minute concavities in the surface in an area corresponding to the seal;

wherein the photosetting bonding material flows readily into the minute concavities prior to irradiation; and wherein the seal can withstand a force up to 20 kg/mm exerted at the edge of the liquid crystal display element to separate the plastic substrate therefrom.

27. The liquid crystal display of claim 26, wherein both the plastic substrate and the glass substrate have minute concavities in the surface in an area corresponding to the seal.

28. A liquid crystal display element comprising a plastic substrate and a glass substrate and liquid crystal filled therebetween, said plastic and glass substrates opposing each other in parallel with a gap therebetween, wherein said liquid crystal display element includes as a sealing agent a set photosetting bonding material between said plastic and glass substrates;

wherein said plastic substrate or said glass substrate has minute concavities in the surface in an area corresponding to the seal;

wherein the photosetting bonding material flows readily into the minute concavities prior to irradiation; and wherein said plastic substrate, when transmitting a beam of light whose wave length is within an infrared region, absorbs said beam of light in a smaller amount than said photosetting bonding material absorbs the same, said beam of light being irradiated to heat said photosetting bonding material.

* * * * *